Nickerson & Colton,
Globe Valve,
Nº 28,192. Patented May 8, 1860.
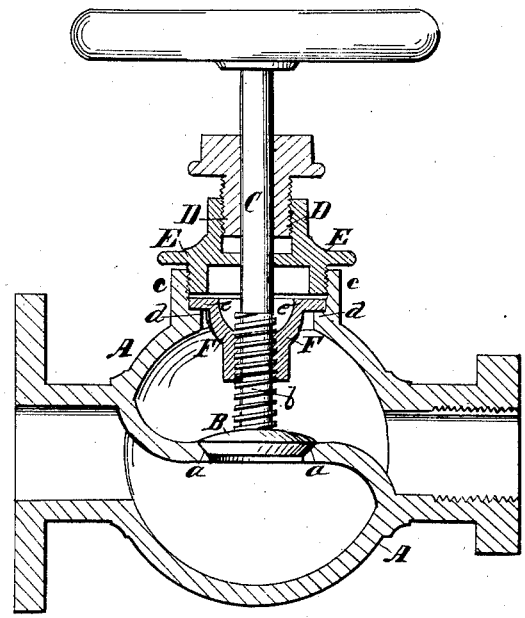
Witnesses:
R. L. Spencer
J. W. Coombs
Inventor:
R. Nickerson
A. B. Colton
Per Munn & Co
Attorneys

UNITED STATES PATENT OFFICE.

REUBEN NICKERSON AND A. B. COLTON, OF ATHENS, GEORGIA.

VALVE-COCK.

Specification of Letters Patent No. 28,192, dated May 8, 1860.

*To all whom it may concern:*

Be it known that we, REUBEN NICKERSON and ALBERT B. COLTON, both of Athens, in the county of Clark and State of Georgia, have invented a new and useful Improvement in Valve-Cocks; and we do hereby declare that the following is a full, clear, and exact description of the same, reference being had to the accompanying drawing, forming part of this specification, said drawing representing a central section of a valve cock with our invention applied.

Our invention consists in a novel and very simple mode of applying the nut in which the screw thread on the valve stem works, which affords very great convenience for grinding the valve whenever necessary, and possesses other advantages over other modes in present use.

To enable others skilled in the art to make and use our invention we will proceed to describe its construction and operation.

A represents the shell of the cock, having the valve seat a, a, constructed and arranged in the usual manner.

B is the valve, having a screw-thread b on the lower part of its stem C, and having its upper part fitted to a stuffing box D, in the movable cap E, which screws into a socket c, c, in the upper part of the shell A.

F is the nut in which the screw-thread b, on the valve stem works to open and close the valve. This nut is made with a flange e, e, which rests upon a shoulder d, d, formed round the lower part of the interior of the shell, and which is held down upon the said shoulder by the cap E, being screwed down closely upon it. The lower face of the said flange is ground to the shoulder d, d, so that it constitutes a packing to the cap E, and protects its screw from the steam and water, and the exterior periphery of the said flange fits snugly but easily into the lower portion of the socket c, c, below its female screw thread, into which the male screw of the cap is fitted. The external portion of the nut, below the flange e, e, may also be fitted snugly but easily into the lower part of the socket c, c, below the shoulder d, d.

When the cap E, is screwed down tightly upon the flange e, e, of the nut F, and the said nut thereby prevented turning, the turning of the valve stem by the wheel or handle G, on its head opens or closes the valve by the movement of the screw-thread b, in the nut; but by increasing the cap E, to the extent of a mere fractional portion of a revolution to liberate the flange e, e, from its pressure, the nut is left free to turn along with the valve stem, and the valve free to turn in its seat for the purpose of grinding, and in the grinding operation the flange e, e, of the nut F, keeps the valve stem perpendicular to the seat or parallel with the axis thereof, and causes the valve to be ground perfectly true; and by unscrewing the cap E, entirely out of the socket c, c, the valve and nut are permitted to be withdrawn together from the shell. The facility thus afforded for grinding the valve, it will be at once seen, is very great, as no wrench or screwdriver is required to be applied unless it be the cap E, and thus, if the flange e, e, be properly fitted to its seat in the shoulder d, d, may be turned by hand, and, besides this advantage, the cock consists of few parts, and is of very simple construction.

What we claim as our invention, and desire to secure by Letters Patent, is—

The flanged nut F, fitted and applied to the socket e, e, and secured by the screwed cap E, substantially as herein described.

REUBEN NICKERSON.
ALBERT B. COLTON.

Witnesses:
   P. A. SUMMERS,
   JOHN FITZPATRICK.